B. A. BALLINGER.
TRUCK.
APPLICATION FILED MAY 6, 1911.

1,024,469.

Patented Apr. 23, 1912.
2 SHEETS—SHEET 1.

Witnesses:

Inventor;
Bert A. Ballinger
by ____ his attorney.

COLUMBIA PLANOGRAPH CO., WASHINGTON, D. C.

B. A. BALLINGER.
TRUCK.
APPLICATION FILED MAY 6, 1911.

1,024,469.

Patented Apr. 23, 1912.

2 SHEETS—SHEET 2.

Witnesses:
Clarence J. Williams
M. Fleury

Inventor,
Bert A. Ballinger
by Anton Gloetzner
his Attorney.

COLUMBIA PLANOGRAPH CO., WASHINGTON, D. C.

UNITED STATES PATENT OFFICE.

BERT A. BALLINGER, OF LOS ANGELES, CALIFORNIA.

TRUCK.

1,024,469.      Specification of Letters Patent.      Patented Apr. 23, 1912.

Application filed May 6, 1911. Serial No. 625,635.

*To all whom it may concern:*

Be it known that I, BERT A. BALLINGER, a citizen of the United States, residing at Los Angeles, in the county of Los Angeles and State of California, have invented a certain new and useful Truck, of which the following is a specification.

My invention relates to a truck for transporting weighty and bulky articles, and has especial reference to an improvement over the class of truck described more particularly in my co-pending application for patent filed April 14, 1910, Serial No. 555,537.

An object of this invention is to provide a truck in which all of the essentials of a plurality of separate trucks are incorporated, thereby reducing the weight and size of the same, and enabling as much stuff to be transported as is now possible with an ordinary wagon or horse truck.

Another object of this invention is to provide a truck that is readily convertible from a push truck to a pull and dolly truck.

With these and other objects in view this invention consists of the features, details of construction and combination of parts described in connection with the accompanying drawings and then more particularly pointed out in the claims.

Figure 1:
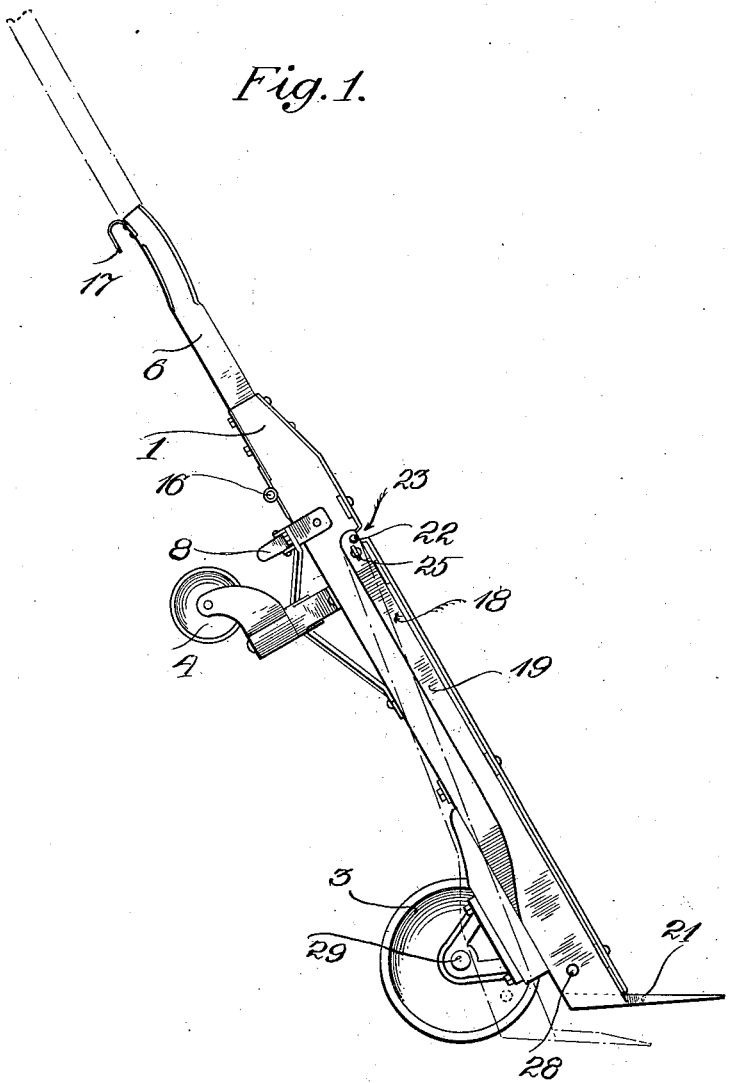
Figure 2:
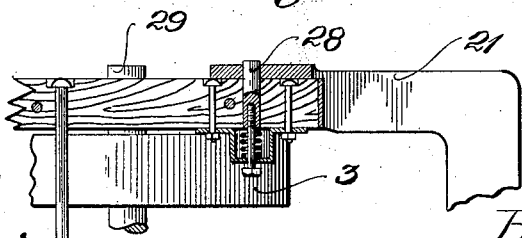
Figure 3:
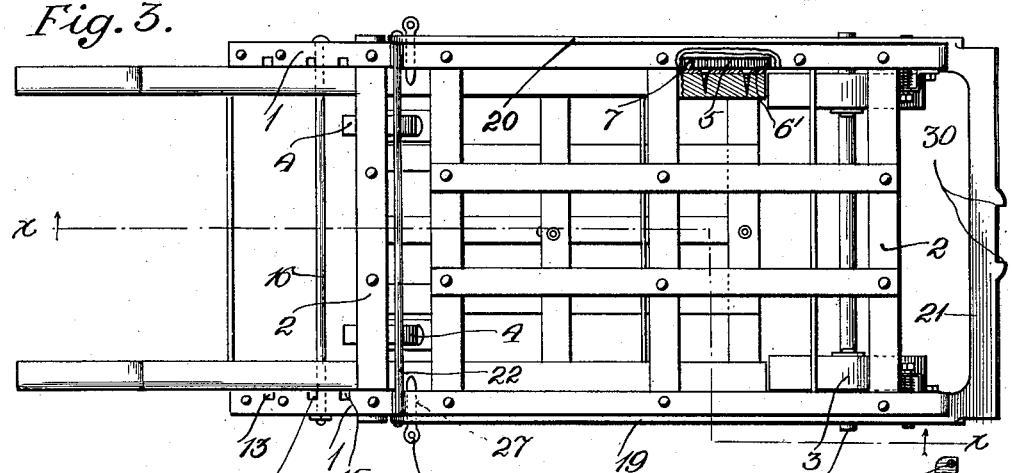
Figure 4:
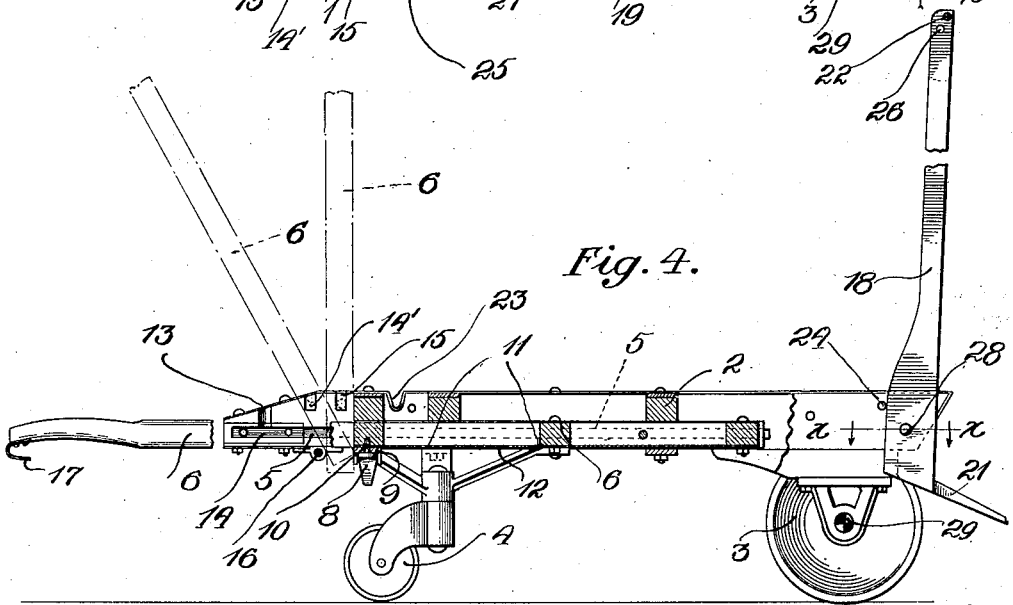

In the drawings—Figure 1 is a side elevation of my invention; Fig. 2 is a fragmentary sectional detail showing means for fastening the forward lip in position; Fig. 3 is a plan view showing the complete truck; Fig. 4 is a sectional elevation on lines X X, Fig. 3 showing the guard in raised position; dotted lines indicating the position of the truck handle or draft-shaft when entirely withdrawn and used as a guard; and Fig. 5 is a detail showing fragment of the forward end of the truck, and the handle or draft-shaft drawn out to its fullest length, and the end resting on the ground, in which position the handle may be used as a skid.

The truck comprises a frame or platform consisting of side strips 1 and connecting strips 2, mounted on stationary wheels 3 and universally movable casters 4, which latter are removable for purposes appearing more fully hereafter. Each of the side strips 1 of the frame is provided with a groove 5, which extends to the forward end of the strips 1. Between said strips is a handle or draft bar 6, which is extensible relatively to said strips and which is provided with pins 7 that normally rest in the grooves 5 and serve as a guide for the handle 6. The pins 7 are integral with plates 6' which are screwed in the sides of the handle and are located at a point removed from the end of the handle for purposes more fully described hereafter. Said handle is locked in various points of extension by means of a spring catch 8, pivotally mounted on a flat bar 9 which connects the side strips 1 on the bottom. The stud 10 of said catch is arranged to engage the orifices 11 disposed at intervals on a flat strip 12 provided centrally of the handle 6. On the inside of the forward end of each of said side strips 1 is a vertical channel 13 which communicates with a metallic member 14 having a groove contiguous with the groove 5 of the side strips. This member 14 is closed at the extreme end and is arranged to form a butt for the pins 7 of the handle when the latter is withdrawn for the purpose of pulling the truck. The side strips are likewise provided with notches 14' and 15.

When the truck is used for transporting a quantity of bulk, front and end guards are necessary, especially where the goods are piled high on the truck. In this case the forward guard for the truck is formed by the handle 6 as seen in dotted lines on Fig. 4. Said handle is withdrawn until the pins 7 thereof are in register with the channel 13, by means of which the handle is dissociated from the truck frame. If it is desired to have the forward guard or handle in an inclined position, which is desirable particularly for moving bales of cotton, barrels and like commodities, the pins 7 of the handle are inserted in the notches 14', while the end of the handle enters between the aforementioned bar 9 and a rod 16 fastened to the bottom of the frame. When in such position the handle 6 forms a rigid guard and the truck may be pushed or pulled about by it. By inserting the pins of the handle in the notch 15 and allowing the free end thereof to extend between the bar 9 and rod 16, a vertical rigid guard may be obtained.

Figure 5:
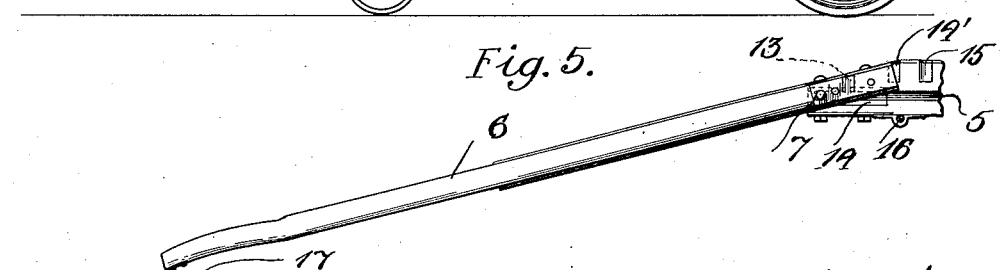

In Fig. 5 I have shown how the handle may be utilized as a skid for facilitating loading of heavy and cumbersome boxes and articles from the ground or floor onto the truck. The skid may be used for unloading wagons or goods from a raised position, and to insure a hold of the skid on the gate of a wagon I provide on the handle ends a plurality of hooks 17. The rear end of the frame of the truck is also provided with a guard 18 consisting of two arms 19 and 20 embracing, when the guard is in normal closed position, the sides and being on a level with the top of the side strips 1. At one end the arms 19 and 20 are conjoined by a lip 21, while at the other end such arms are secured together by a rod 22, which when the guard is in folded position, rests in the grooves 23 provided in the top of the side strips. Said arms 19 and 20 are pivoted in the side strips 1 and when raised as shown in Fig. 4, are held in such upright position by studs 24. When in closed position, that is, when the connecting rod 22 is in the grooves 23, pins 25 are inserted through the orifices 26 in the upper ends of the arms and through the orifices 27 provided in the side strips, in order to lock same in such position.

The pivots 28 for the arms 19 and 20 are withdrawable in order to permit the lip end to drop below the surface of the frame, as seen in dotted lines, Fig. 1. When such pivot pins are withdrawn the arms 19 and 20 of the guard drop onto the projecting ends of the axle 29. By removing the pins 25 and the pivots 28, the entire guard may be removed from the truck. The said lip 21 is provided with acuminate projections or prongs 30, in order to obviate the necessity for forcing the lip under the article to be moved, preparatory to shifting it onto the truck, an expedient especially desirable for the movement of round articles, such as barrels and logs.

What I claim is—

1. A truck comprising a frame provided with a pair of wheels and a pair of casters, a guard pivoted in the rear end of said frame, and provided with a lip, means to hold said guard in upright position, means to release the forward end of said guard to cause same to drop below the surface of said frame, a handle in said frame, and extensible relatively thereto, means to lock said handle at various points of extension and means to secure said handle in upright position.

2. A truck comprising a frame having a pair of wheels and a pair of casters, said frame consisting of side strips and connecting strips, each of said side strips having a longitudinal groove and vertical notches in the forward ends thereof, and a channel communicating with said groove, a handle between said side strips provided with pins arranged to slide in said grooves, said handle being arranged to be entirely withdrawn when the pins are in register with said channel, the pins of said handle being arranged to be inserted in said notches whereby to rigidly secure said handle in upright position.

3. A truck comprising a frame having a pair of wheels and a pair of casters, said frame consisting of side strips and connecting strips, each of said side strips having a groove, a handle between said side strips and provided with pins arranged to slide in said grooves, said handle being extensible relatively to and withdrawable from said side strips, means to lock said handle at various points of extension, means on said side strips to hold said handle in upright position relatively to said frame, a guard pivoted on said side strips and removable therefrom, said guard coöperating with said handle when in upright position, and being provided with a lip, and means to hold said guard rigidly in upright position.

4. A truck comprising a frame having a pair of wheels and a pair of casters, said frame consisting of side strips and connecting strips, each of said side strips having a groove, a guard pivoted on said side strips, said guard having a connecting rod normally lying in the grooves of said side strips, and a lip extending beyond and free of the ends of the side strips, the pivots for said guard being withdrawable to cause the lip end thereof to drop below the surface of said side strips, said guard being entirely removable from said side strips, and means to hold said guard in upright position.

In testimony whereof I affix my signature in the presence of two witnesses.

BERT A. BALLINGER.

Witnesses:
ANTON GLOETZNER, Jr.,
F. J. McCLARY.

Copies of this patent may be obtained for five cents each, by addressing the "Commissioner of Patents, Washington, D. C."